US012598236B2

(12) United States Patent
Fang et al.

(10) Patent No.: US 12,598,236 B2
(45) Date of Patent: **\*Apr. 7, 2026**

(54) OWNER CONTROLLED AND INCENTIVISED SMARTPHONE PLATFORM BASED ON MICROSERVICES

(71) Applicant: T-MOBILE INNOVATIONS LLC, Overland Park, KS (US)

(72) Inventors: Zheng Fang, McLean, VA (US); Ankit Arvind Muchhala, Leesburg, VA (US); Herkole Sava, Centreville, VA (US); Michael Scott Witherell, Portland, OR (US)

(73) Assignee: T-MOBILE INNOVATIONS LLC, Overland Park, KS (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/675,805

(22) Filed: May 28, 2024

(65) Prior Publication Data

US 2024/0314212 A1 Sep. 19, 2024

Related U.S. Application Data

(63) Continuation of application No. 17/682,075, filed on Feb. 28, 2022, now Pat. No. 12,028,423.

(51) Int. Cl.
*H04L 67/00* (2022.01)
*G06Q 20/32* (2012.01)
*H04W 4/029* (2018.01)

(52) U.S. Cl.
CPC ......... *H04L 67/34* (2013.01); *G06Q 20/3255* (2013.01); *H04W 4/029* (2018.02)

(58) Field of Classification Search
None
See application file for complete search history.

(56) References Cited

U.S. PATENT DOCUMENTS

| | | | |
|---|---|---|---|
| 10,034,136 B2 | 7/2018 | Egner et al. | |
| 11,032,164 B1 * | 6/2021 | Rothschild | .......... H04L 41/5045 |
| 11,108,637 B1 | 8/2021 | Paczkowski et al. | |
| 2015/0256623 A1 * | 9/2015 | Ryhorchuk | ............. H04L 67/12 709/217 |

(Continued)

FOREIGN PATENT DOCUMENTS

| | | | |
|---|---|---|---|
| CN | 111062797 A | 4/2020 | |
| CN | 112148484 A * | 12/2020 | ............. G06F 9/505 |
| CN | 115834689 A * | 3/2023 | |

*Primary Examiner* — Ario Etienne
*Assistant Examiner* — Mohammad Yousef A. Mian

(57) ABSTRACT

A wireless communication system authorizes a User Equipment (UE) to use a wireless network slice. The wireless communication system transfers a user application for the wireless network slice to the UE. The wireless communication system generates a container instruction for the user application and transfers the container instruction to the UE. The UE executes the user application in an operating system container per the container instruction. The UE generates user application data in response to the execution of the user application. The UE transfers the user application data to the authorized wireless network slice. The wireless communication system receives the user application data from the UE into the authorized wireless network slice.

20 Claims, 10 Drawing Sheets

(56)  References Cited

U.S. PATENT DOCUMENTS

| | | | |
|---|---|---|---|
| 2019/0114210 A1* | 4/2019 | Han | G06F 9/5077 |
| 2019/0208275 A1* | 7/2019 | Montgomery | H04N 21/472 |
| 2019/0288771 A1* | 9/2019 | Metzger | H04W 24/02 |
| 2020/0272912 A1* | 8/2020 | Chacko | G06F 9/547 |
| 2023/0021723 A1* | 1/2023 | Karuppannan | H04L 67/148 |

* cited by examiner

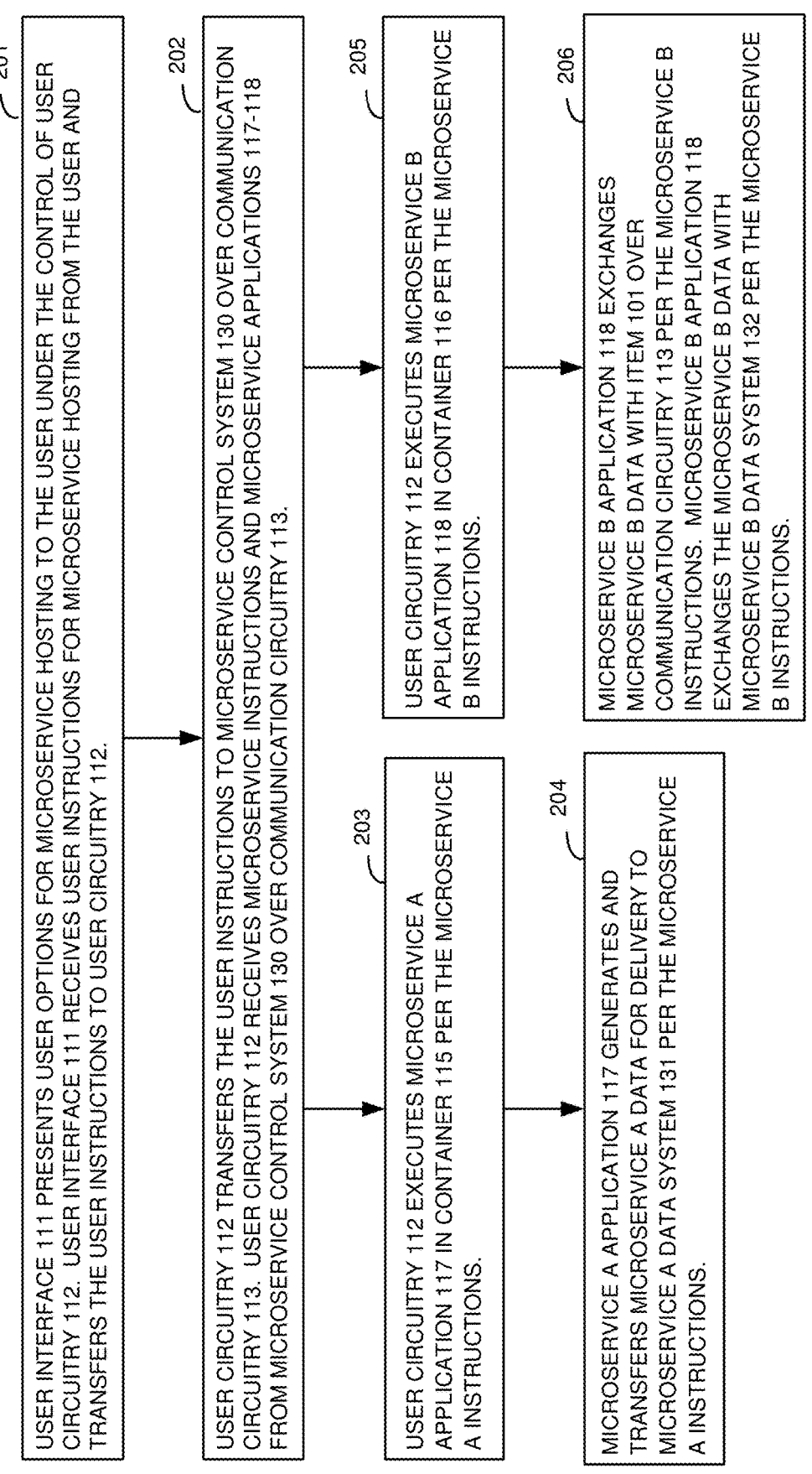

201

USER INTERFACE 111 PRESENTS USER OPTIONS FOR MICROSERVICE HOSTING TO THE USER UNDER THE CONTROL OF USER CIRCUITRY 112. USER INTERFACE 111 RECEIVES USER INSTRUCTIONS FOR MICROSERVICE HOSTING FROM THE USER AND TRANSFERS THE USER INSTRUCTIONS TO USER CIRCUITRY 112.

202

USER CIRCUITRY 112 TRANSFERS THE USER INSTRUCTIONS TO MICROSERVICE CONTROL SYSTEM 130 OVER COMMUNICATION CIRCUITRY 113. USER CIRCUITRY 112 RECEIVES MICROSERVICE INSTRUCTIONS AND MICROSERVICE APPLICATIONS 117-118 FROM MICROSERVICE CONTROL SYSTEM 130 OVER COMMUNICATION CIRCUITRY 113.

203

USER CIRCUITRY 112 EXECUTES MICROSERVICE A APPLICATION 117 IN CONTAINER 115 PER THE MICROSERVICE A INSTRUCTIONS.

204

MICROSERVICE A APPLICATION 117 GENERATES AND TRANSFERS MICROSERVICE A DATA FOR DELIVERY TO MICROSERVICE A DATA SYSTEM 131 PER THE MICROSERVICE A INSTRUCTIONS.

205

USER CIRCUITRY 112 EXECUTES MICROSERVICE B APPLICATION 118 IN CONTAINER 116 PER THE MICROSERVICE B INSTRUCTIONS.

206

MICROSERVICE B APPLICATION 118 EXCHANGES MICROSERVICE B DATA WITH ITEM 101 OVER COMMUNICATION CIRCUITRY 113 PER THE MICROSERVICE B INSTRUCTIONS. MICROSERVICE B APPLICATION 118 EXCHANGES THE MICROSERVICE B DATA WITH MICROSERVICE B DATA SYSTEM 132 PER THE MICROSERVICE B INSTRUCTIONS.

FIGURE 2

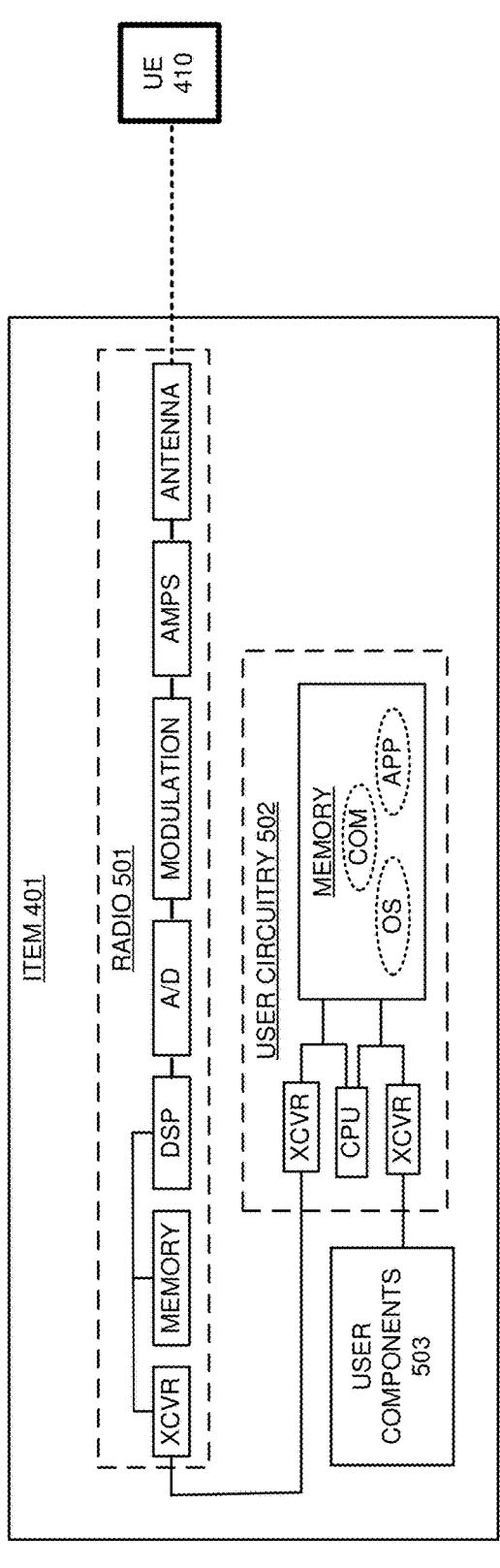
FIGURE 5

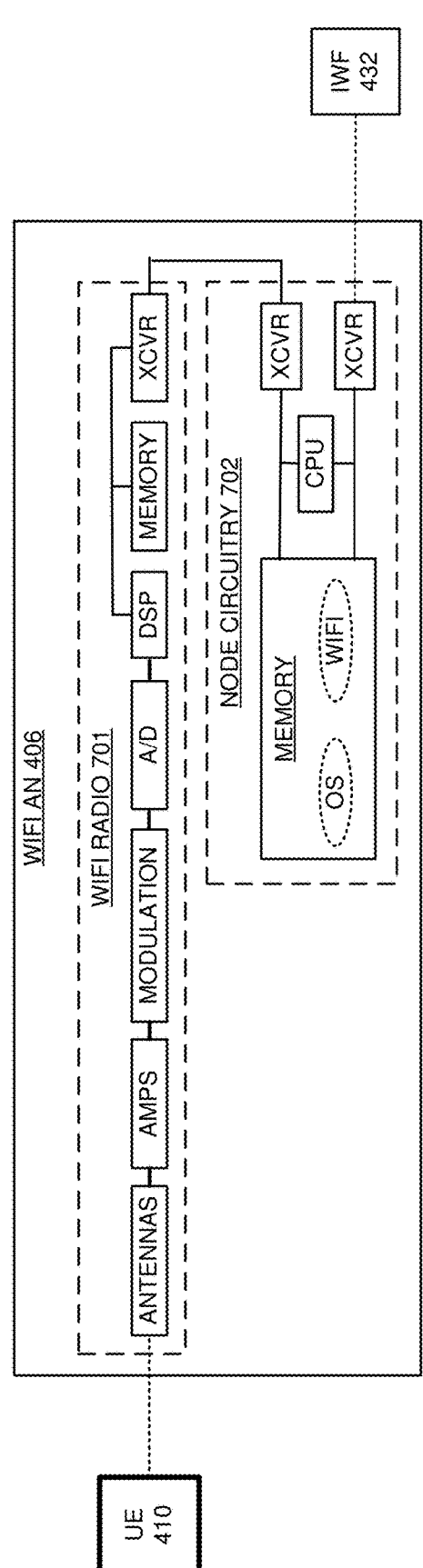
FIGURE 7

OWNER CONTROLLED AND INCENTIVISED SMARTPHONE PLATFORM BASED ON MICROSERVICES

RELATED CASES

This United States Patent Application is a continuation of U.S. patent application Ser. No. 17/682,075 that was filed on Feb. 28, 2022 and is entitled "OWNER CONTROLLED AND INCENTIVISED SMARTPHONE PLATFORM BASED ON MICROSERVICES." U.S. patent application Ser. No. 17/682,075 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smart-phone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN), Bluetooth Low Energy (BLE), for example. The wireless access nodes exchange network signaling and user data with network elements that are often clustered together into wireless network cores. The wireless network elements comprise Access and Mobility Management Functions (AMFs), User Plane Functions (UPFs), and the like.

Some wireless user devices operate as wireless relays that wirelessly exchange user data with end-devices and wire-lessly exchange this user data with wireless communication networks. The wireless user devices may gather Internet-of-Things (IoT) data and forward the IoT data to IoT servers over the wireless communication networks. Some wireless user devices operate as distributed computing nodes to mine crypto-currency or the like. Unfortunately, the wireless user devices that serve as wireless relays and distributed computing nodes do not feature efficient user control, optimized use of wireless communications, or in-device resource allocation. Moreover, the wireless user devices are not effectively matched with the consumers of microservices.

TECHNICAL OVER VIEW

In some examples, a User Equipment (UE) is authorized to use a wireless network slice. A user application for the authorized wireless network slice is transferred to the UE. A container instruction for the user application is generated and transferred to the UE. The UE executes the user application in an operating system container per the container instruction. The UE generates user application data in response to the execution of the user application and transfers the user application data to the authorized wireless network slice. The user application data is received from the UE into the authorized wireless network slice.

In some examples, one or more non-transitory computer readable storage media stores program instructions. When executed by a computing system, the program instructions direct the computing system to perform the following operations. Transfer a user application for the authorized wireless network slice to the UE. Generate a container instruction for the user application and transfer the container instruction to the UE. Receive user application data from the UE into the authorized wireless network slice. The UE (not the computing system) executes the user application in an operating system container per the container instruction, generates the user application data in response to the execution of the user application, and transfers the user application data to the authorized wireless network slice.

In some examples, a wireless communication system comprises a microservice controller and a wireless network slice. The microservice controller transfers microservice information to a wireless User Equipment (UE), and in response, receives a user instruction from the wireless UE. The microservice controller selects a microservice application and a microservice slice based on the user instruction. The microservice controller generates a microservice instruction for the selected microservice application. The microservice controller transfers the microservice instruction and the selected microservice application to the wireless UE. The wireless UE executes the selected microservice application in an operating system container per the micro-service instruction to generate and transfer microservice data to the selected microservice slice. The selected microservice slice receives and processes the microservice data.

DESCRIPTION OF THE DRAWINGS

FIG. 2 illustrates an exemplary operation of the wireless communication system that comprises the wireless UE to host the microservice.

FIG. 5 illustrates an exemplary user item in the 5G communication network.

FIG. 7 illustrates an exemplary IEEE 802.11 (WIFI) AN in the 5G communication network.

DETAILED DESCRIPTION

Figure 1:
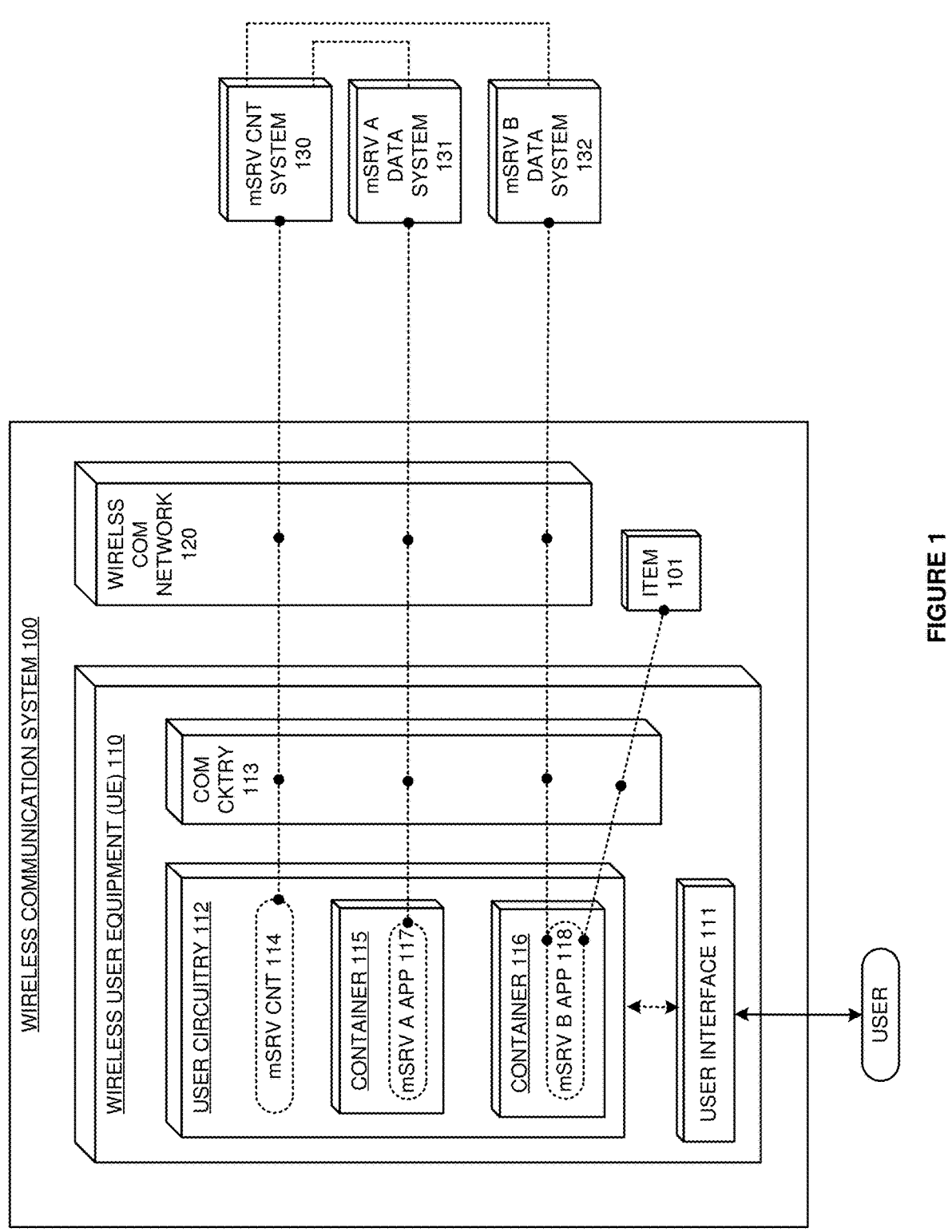
FIG. 1 illustrates an exemplary wireless communication system that comprises a wireless User Equipment (UE) to host a microservice.

FIG. 1 illustrates exemplary wireless communication system 100 that comprises wireless User Equipment (UE) 110 to host microservice A and microservice B. Wireless communication system 100 comprises item 101, wireless UE 110, wireless communication (COM) network 120. Wireless UE 110 comprises user interface 111, user circuitry 112, and communications circuitry (COM CKTRY) 113. User circuitry 112 comprises microservices (mSRV) controller 114 and containers 115-116. Containers 115-116 execute respective microservice applications 117-118. Item 101 comprises a computer, phone, sensor, vehicle, robot, or some other data appliance with wireless communication circuitry. Wireless UE 110 communicates with microservice control system 130, microservice A data system 131, and microservice B data system 132 over wireless communication network 120. The number of items, UEs, and networks shown on FIG. 1 is restricted for clarity and wireless communication system 100 typically includes many more items, UEs, and networks than shown. Multiple UEs like UE 110 may wirelessly link to form a chain or mesh network to reach wireless communication network 120. One or more of microservice systems 130-132 may be integrated within wireless communication system 100.

Various examples of network operation and configuration are described herein. In some examples, user interface 111 presents user options for microservice hosting to a user under the control of microservices controller 114 in user circuitry 112. User interface 111 receives user instructions for microservice hosting from the user and transfers the user instructions to microservices controller 114 in user circuitry 112. The user options and instructions specify microservice hosting in UE 101 based on factors like microprocessor quality and usage, memory quality and usage, data communications quality and usage, battery-status, geographic-location, time/day/date, financial-compensation, and monetary currency. Different financial compensation levels may correlate to different Quality-of-Service (QoS) levels, or other criteria. Microservices controller 114 transfers the user instructions to microservice control system 130 over communication circuitry 113 and wireless communication network 120.

Microservice control system 130 receives user instructions for microservice hosting from UE 101 and other UEs. Microservice control system 130 receives microservice requests for data systems 131-132 and other data systems. Microservice control system 130 matches the user instructions for microservice hosting with the microservice requests based on factors like microprocessor quality and usage, memory quality and usage, data communications quality and usage, battery-status, geographic-location, time/day/date, financial-compensation, and monetary currency. Different financial compensation levels may correlate to different QoS levels or other factors. In this example, microservice control system 130 matches UE 101 with microservice A and microservice B based on the user instructions from UE 101 and the microservice requests from microservice data systems 131-132. Microservice control system 130 generates microservice instructions that integrate matching or corresponding context from the user instructions and the microservice requests. Microservice control system 130 transfers microservice A instructions, microservice A application 117, microservice B instructions, and microservice B application 118 to microservices controller 114 in user circuitry 112 over wireless communication network 120 and communication circuitry 113.

In user circuitry 112, microservice controller 114 receives the microservice instructions and microservice applications 117-118. Microservice controller 114 requests user circuitry 112 to execute microservice A application 117 per the microservice A instructions. Microservice controller 114 requests user circuitry 112 to execute microservice B application cation 118 per the microservice B instructions. User circuitry 112 executes an operating system that generates operating system container 115 to execute microservice A application 117 per the microservice A instructions. User circuitry 112 executes the operating system to generate operating system container 116 that executes microservice B application 118 per the microservice B instructions. When executed in container 115, microservice A application 117 generates and transfers microservice A data for delivery to microservice A data system 131 per the microservice A instructions. Microservice A application 117 typically receives processing tasks from microservice A data system 131 and generates the microservice A data in response. User circuitry 112 transfers the microservice A data to microservice A data system 131 over communication circuitry 113 and wireless communication network 120 per the microservice A instructions. When executed in container 116, microservice B application 118 exchanges microservice B data with item 101 over communication circuitry 113 per the microservice B instructions. Microservice B application 118 exchanges the microservice B data with microservice B data system 132 per the microservice B instructions. Microservice B application 118 may process the microservice B data. For example, microservice B application 118 may average sensor readings and transfer the average sensor readings. User circuitry 112 transfers the microservice B data to microservice B data system 132 over communication circuitry 113 and wireless communication network 120 per the microservice B instructions.

Advantageously, wireless UE 110 hosts microservices like wireless relay and distributed computing with efficient user control. Moreover, wireless UE 110 facilitates effective matches with the consumers of microservices A and B—data systems 131-132. Communication circuitry 113 wirelessly communicates with item 101 and wireless communication network 120 over radio channels or some other wireless communication media. The wireless communications use technologies like Institute of Electrical and Electronic Engineers (IEEE) 802.11 (WIFI), Internet-of-Things (IoT), Bluetooth Low Energy (BLE), Fifth Generation New Radio (5GNR), Long Term Evolution (LTE), Low Power Wide Area Network (LP-WAN), Ultra-Wide-Band (UWB), and Radio Frequency Identification (RFID). Wireless communication system 100 and microservice systems 130-132 communicate over network connections that comprise metallic wiring, glass fibers, radio channels, or some other communication media. The network connections may use WIFI, IoT, Bluetooth, 5GNR, LTE, LP-WAN, UWB, RFID, IEEE 802.3 (ETHERNET), Internet Protocol (IP), Time Division Multiplex (TDM), Data Over Cable System Interface Specification (DOCSIS), Synchronous Optical Network (SONET), virtual switching, inter-processor communication, bus interfaces, and/or some other data communication protocols. Item 101, UE 110, network 120, and systems 130-132 comprise microprocessors, software, memories, transceivers, radios, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, relay applications, network applications, radio applications, and network functions. The microprocessors retrieve the software from the memories and execute the software to drive the operation of wireless communication system 100 as described herein.

FIG. 2 illustrates an exemplary operation of wireless communication system 100 that comprises wireless UE 110 to host microservice A and microservice B. The operation may vary in other examples. User interface 111 presents user options for microservice hosting to the user under the control of user circuitry 112 (201). User interface 111 receives user instructions for microservice hosting from the user and transfers the user instructions to user circuitry 112 (201). User circuitry 112 transfers the user instructions to microservice control system 130 over communication circuitry 113 (202). User circuitry 112 receives microservice instructions and microservice applications 117-118 from microservice control system 130 over communication circuitry 113 (202). User circuitry 112 executes microservice A application 117 in container 115 per the microservice A instructions (203). Microservice A application 117 generates and transfers microservice A data for delivery to microservice A data system 131 per the microservice A instructions (204). User circuitry 112 executes microservice B application 118 in container 116 per the microservice B instructions (205). Microservice B application 118 exchanges microservice B data with item 101 over communication circuitry 113 per the microservice B instructions (206). Microservice B application 118 exchanges the microservice B data with microservice B data system 132 per the microservice B instructions (206).

Figure 3:
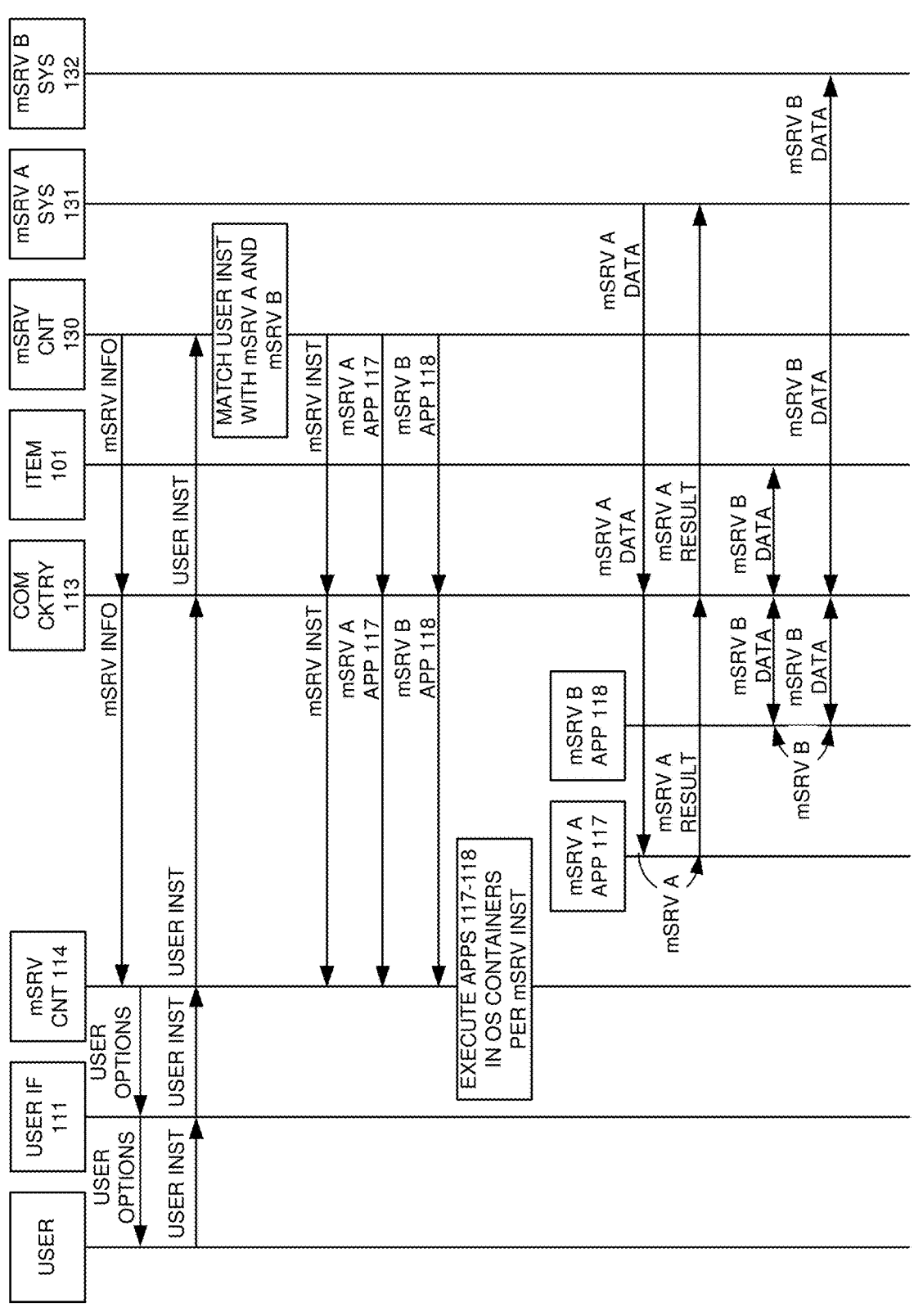
FIG. 3 illustrates an exemplary operation of the wireless communication system that comprises the wireless UE to host the microservice.

FIG. 3 illustrates an exemplary operation of wireless communication system 100 that comprises wireless UE 110 to host microservice A and microservice B. The operation may vary in other examples. Microservice control system 130 transfers microservice information to microservice controller (CNT) 114 over communication circuitry 114. The microservice information indicates various user options for participating in microservice hosting. Microservice controller 114 drives user interface (IF) 111 to present user options for microservice hosting that are based on the microservice information. User interface 111 receives user instructions for microservice hosting from the user and transfers the user instructions to microservices controller 114. Microservices controller 114 transfers the user instructions to microservice control system 130 over communication circuitry 113. Microservice control system 130 matches UE 101 with microservice A and microservice B based on the user instructions and microservice requests from microservice data systems 131-132. For example, UE 101 may offer low-cost IoT backhaul in a remote geographic area that is accepted by an IoT microservice that deploys environmental sensors the remote geographic area. Microservice control system 130 generates microservice instructions that integrate the corresponding requirements from the user instructions and the microservice requests. Microservice control system 130 transfers microservice A instructions, microservice B instructions, microservice A application 117, and microservice B application 118 to microservices controller 114 over communication circuitry 113. Microservice controller 114 drives the execution of microservice A application 117 in user circuitry 112 per the microservice A instructions. Microservice controller 114 drives the execution of microservice B application 118 in user circuitry 112 per the microservice B instructions. In operating system container 115, microservice A application 117 receives microservice A data for processing, processes the microservice A data to generate microservice A results, and transfers the microservice A results to microservice A data system 131 per the microservice A instructions. In operating system container 116, microservice B application 118 exchanges microservice B data with item 101 over communication circuitry 113 per the microservice B instructions. Microservice B application 118 exchanges the microservice B data with microservice B data system 132 per the microservice B instructions. Microservice B application 118 may process or the microservice B data while in transit. Microservice B application 118 transfers the microservice B data to microservice B data system 132 over communication circuitry 113 per the microservice B instructions.

Figure 4:
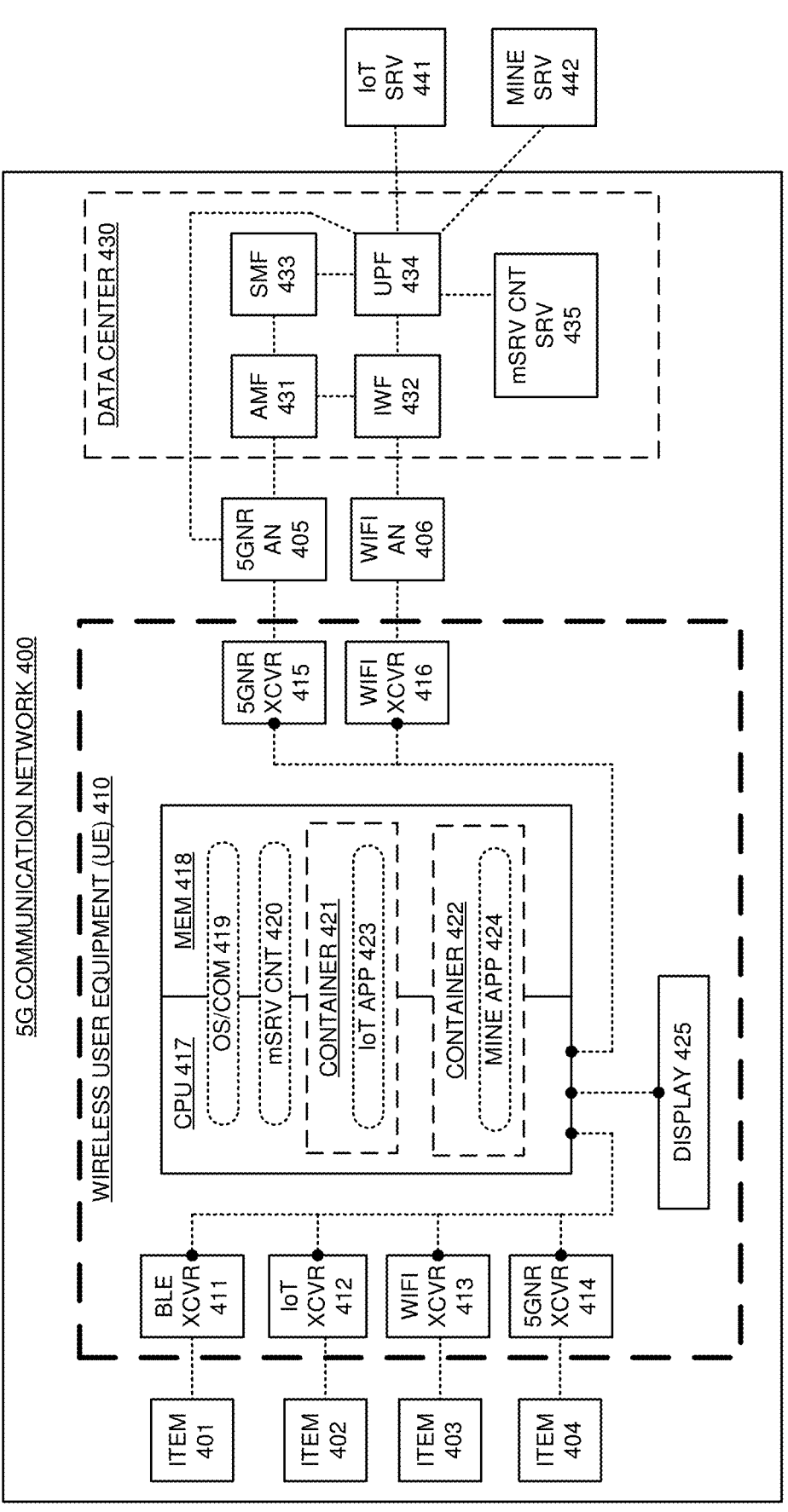
FIG. 4 illustrates an exemplary Fifth Generation (5G) communication network that comprises a wireless UE to host an Internet-of-Things (IoT) microservice and a crypto-currency mining microservice.

FIG. 4 illustrates an exemplary Fifth Generation (5G) communication network 400 that comprises wireless UE 410 to host an IoT microservice and a crypto-currency mining microservice. 5G communication network 400 comprises an example of wireless communication system 100, although system 100 may differ. 5G communication network 400 comprises: items 401-404, wireless UE 410, 5GNR Access Node (AN) 405, WIFI AN 406, and network data center 430. Wireless UE 410 comprises BLE transceiver 411, IoT transceiver 412, WIFI transceiver 413, 5GNR transceiver 414, 5GNR transceiver 415, WIFI transceiver 416, Central Processing Unit (CPU) 417, memory 418, and display 425. Memory 418 stores software, and CPU 417 executes this software to control the operation of UE 410. The software comprises Operating System and Communication (OS/COM) 419, microservices controller (mSRV CNT) 420, IoT microservices application 423, and mining microservices application 424. OS/COM 419 comprises a containerized operating system and a Third Generation Partnership Project (3GPP) protocol stack. CPU 417 executes OS/COM 419 to form containers 421-422 that each have isolated and protected microprocessing and memory resources. Container 421 stores and executes IoT microservices application 423, and container 422 stores and executes mining microservices application 424. Network data center 430 comprises Access and Mobility Management Function (AMF) 431, non-3GPP Interworking Function (IWF) 432, Session Management Function (SMF) 433, User Plane Function (UPF) 434 and microservices control server (mSRV CNT SRV) 435. Data center 430 is simplified for clarity and typically includes additional network elements like Network Repository Function (NRF) and Unified Data Management (UDM).

When wireless UE 410 is activated, CPU 417 retrieves OS/COM 419 from memory 418. CPU 417 executes OS/COM 419 to direct 5GNR transceiver 415 and WIFI transceiver 416 to scan for wireless ANs. OS/COM 419 directs 5GNR transceiver 405 to attach to 5GNR AN 405. OS/COM 419 is authenticated by and registers with AMF 431 over 5GNR transceiver 415 and 5GNR AN 405. OS/COM 419 directs WIFI transceiver 416 to attach to WIFI AN 406. OS/COM 420 establishes a secure connection to IWF 432 over WIFI transceiver 416 and WIFI AN 406. OS/COM 419 is authenticated by and registers with AMF 431 over WIFI transceiver 416 and WIFI AN 406. AMF 431 authorizes UE 410 for a microservices slice and signals SMF 433 to deliver the microservices slice to UE 410. SMF 433 signals UPF 434 to deliver the microservices slice to UE 410. AMF 431 signals 5GNR AN 405 and/or IWF 432 to deliver the microservice slice to UE 410. Microservice controller 420 in UE 410 may now communicate with microservice control server 435 over the microservices slice. Microservices control server 435 transfers microservice participation data to microservice controller 420 over the microservices slice and OS/COM 419.

Microservice controller 420 requests OS/COM 419 to drive display 425 to present user options for microservice hosting that are based on the microservice participation data. Display 425 presents the options, and in response, receives user instructions for microservice hosting from the user and transfers the user instructions to microservices controller 420 over OS/COM 419. The participation data, options, and instructions specify microservice hosting based on factors like microprocessor quality and usage, memory quality and usage, data communications quality and usage, battery-status, geographic-location, time/day/date, financial-compensation, and monetary currency. Different financial compensation levels may correlate to different QoS levels, or other criteria. Microservices controller 420 transfers the user instructions to microservice control server 435 over OS/COM 419 and the microservice slice.

Microservice control server 435 receives the user instructions for microservice hosting from microservice controller 420. Microservice control system 130 receives microservice requests for servers 441-442. Microservice control system 130 matches UEs with microservices based on the user instructions and microservice requests based on corresponding factors like microprocessor quality and usage, memory quality and usage, data communications quality and usage, battery-status, geographic-location, time/day/date, financial-compensation, and monetary currency. UEs and microservices are matched together when they have common requirements in their user instructions and microservice requests. For example, UE 410 may offer and mining server 442 may accept a package that comprises high microprocessor quality and usage, high memory quality and usage, no low battery restrictions, and UE presence at a busy geographic-location in exchange for high financial compensation in desired crypto-currency. Different financial compensation levels may correlate to different QoS levels, or other criteria. In this example, microservice control server 435 matches UE 410 with the IoT microservice and the crypto-currency mining microservice based on the user instructions from UE 410 and the microservice requests from servers 441-442. Microservice control server 435 generates microservice instructions that integrate the common requirements from user instructions and the microservice requests. Microservice control server 435 transfers IoT microservice instructions, IoT application 423, mining microservice instructions, and mining application 424 to microservices controller 420 over the microservices slice and OS/COM 419.

Microservices controller 420 receives the microservice instructions and microservice applications 423-424. Microservice controller 420 directs OS/COM 419 to execute IoT application 423 per the IoT microservice instructions. Microservice controller 420 directs OS/COM 419 to execute mining application 424 per the mining microservice instructions OS/COM 419 generates operating system container 421 to execute IoT application 423 per the IoT microservice instructions. OS/COM 419 generates operating system container 422 to execute mining application 423 per the mining microservice instructions.

When executed in container 421, IoT application 423 exchanges IoT data with items 401-404 over transceivers 411-414 per the IoT microservice instructions. The user instructions and the corresponding IoT microservice instructions may limit the usage of transceivers 411-414 by time, location, battery, usage amount, or some other factors. IoT application 423 may process the IoT data. IoT application 423 exchanges the IoT data with IoT server 441 over OS/COM 419 and the microservices slice per the IoT microservice instructions. When executed in container 422, mining application 424 exchanges mining data with mining server 442 over OS/COM 419 and the microservices slice per the mining microservice instructions. Mining application

424 receives mining tasks from mining server 442 and performs the mining tasks for mining server 442.

FIG. 5 illustrates exemplary user item 401 in 5G communication network 400. User item 401 comprises an example of items 101 and 402-404, although items 101 and 402-404 may differ. Item 401 comprises radio 501, user circuitry 502, and user components 503. User components 503 comprise sensors, controllers, displays, or some other user apparatus that generates and/or consumes user data. Radio 501 comprises an antenna, amplifiers, filters, modulation, analog-to-digital interfaces, DSP, memory, and transceivers that are coupled over bus circuitry. User circuitry 502 comprises memory, CPU, transceivers (XCVRs) that are coupled over bus circuitry. The memory in user circuitry 502 stores an operating system (OS), user application (APP), and communication application (COM). The communication application directs the wireless exchange of relay application data with the relay application in UE 410. The transceiver in radio 501 is coupled to a transceiver in user circuitry 502. A transceiver in user circuitry 502 is coupled to user components 503. The CPU in user circuitry 502 executes the operating system, user application, and communication application to exchange microservices data with UE 410 over radio 501.

Figure 6:
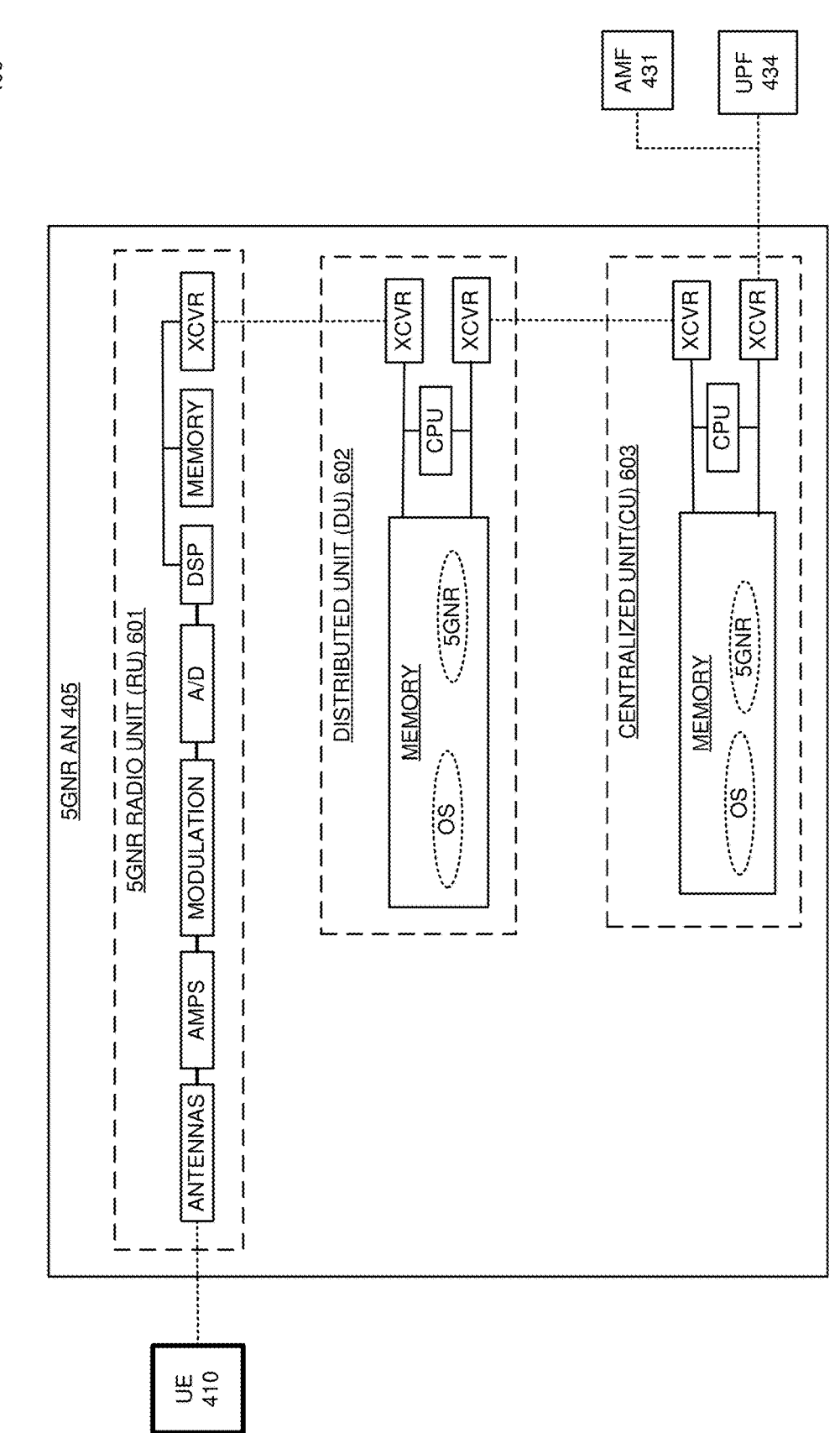
FIG. 6 illustrates an exemplary 5G New Radio (NR) Access Node (AN) in the 5G communication network.

FIG. 6 illustrates exemplary 5G New Radio (NR) Access Node (AN) 405 in 5G communication network 400. 5GNR AN 405 comprises an example of wireless communication network 120, although network 120 may differ. 5GNR AN 405 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for physical layer, media access control, and radio link control. CU 603 comprises memory, CPU, and transceivers that are coupled over bus circuitry. The memory in CU 603 stores an operating system and 5GNR network applications for packet data convergence protocol, service data adaption protocol, and radio resource control. The antennas in 5GNR RU 601 are wirelessly coupled to UE 410 over 5GNR links. Transceivers in 5GNR RU 601 are coupled to transceivers in DU 602. Transceivers in DU 602 are coupled to transceivers in CU 603. Transceivers in CU 603 are coupled AMF 431 and UPF 434. The DSP and CPU in RU 601, DU 602, and CU 603 execute the radio applications, operating systems, and network applications to exchange data and signaling with UE 410, AMF 431, and UPF 434.

FIG. 7 illustrates an exemplary IEEE 802.11 (WIFI) AN 406 in 5G communication network 400. WIFI AN 406 comprises an examples of wireless communication network 120, although, network 120 access may differ. WIFI AN 406 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for WIFI. The antennas in WIFI radio 701 are wirelessly coupled to UE 410 over a WIFI link. Transceivers in WIFI radio 701 are coupled to transceivers in node circuitry 702. Transceivers in node circuitry 702 are coupled to transceivers in IWF 432. The CPU in node circuitry 702 executes the operating system and network applications to exchange signaling and data between UE 410 and IWF 432.

Figure 8:
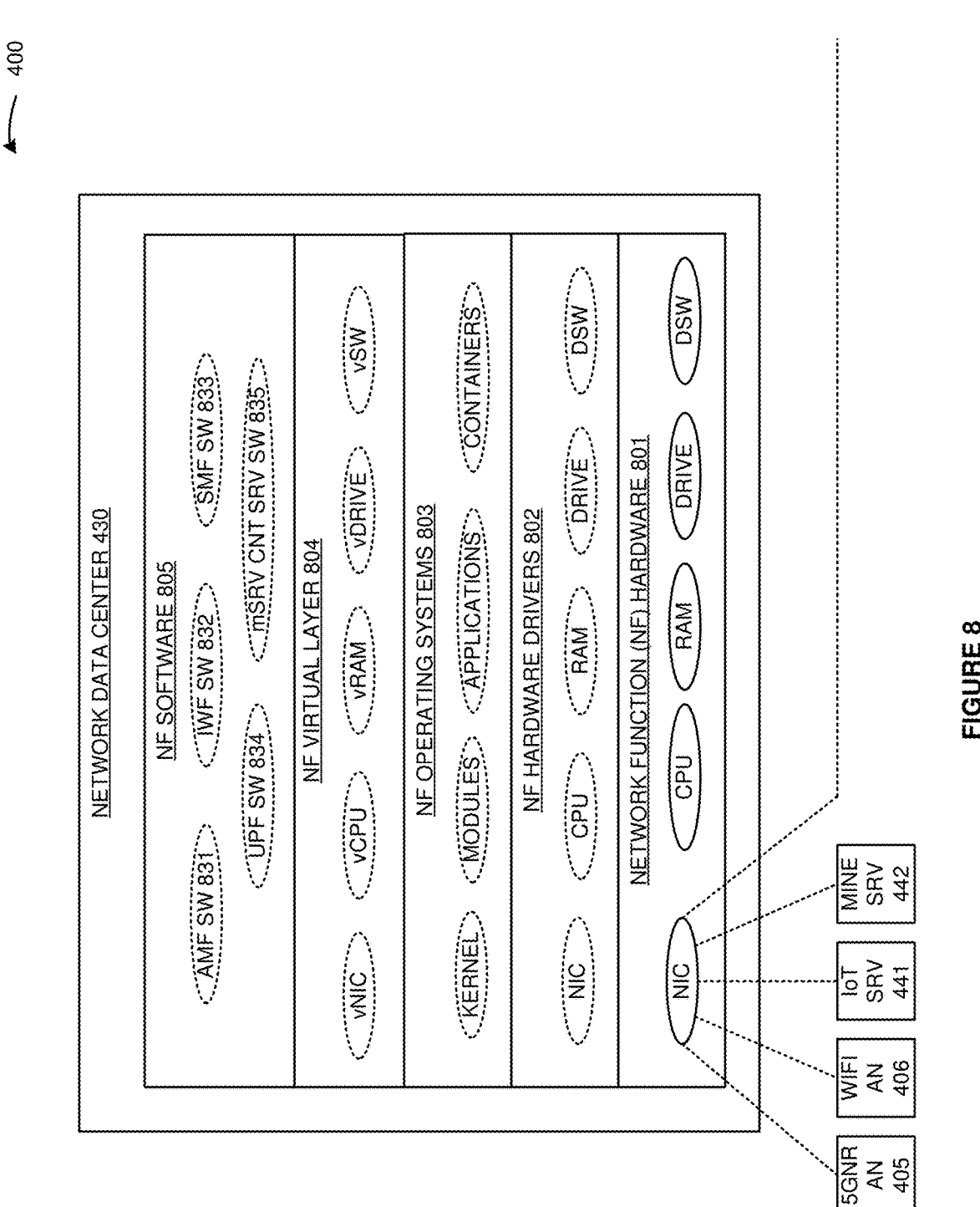
FIG. 8 illustrates an exemplary data center in the 5G communication network.

FIG. 8 illustrates exemplary data center 430 in 5G communication network 400. Network data center 430 comprises an example of wireless communication network 120, although network 120 may differ. Network data center 430 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises AMF SW 831, IWF SW 832, SMF SW 833, UPF SW 834, and mSRV CNT SRV (microservices control server) SW 835. Other NF SW like Network Repository Function (NRF) SW are typically present but are omitted for clarity. Network data center 430 may be located at a single site or be distributed across multiple geographic locations. The NIC in NF hardware 801 are coupled to 5GNR AN 405, WIFI AN 406, IoT server 441, mining (mine) server 442, and external data systems. NF hardware 801 executes NF hardware drivers 802, NF operating systems 803, NF virtual layer 804, and NF SW 805 to form and operate AMF 431, IWF 432, SMF, 433, UPF 434, and microservices control server 435.

Figure 9:
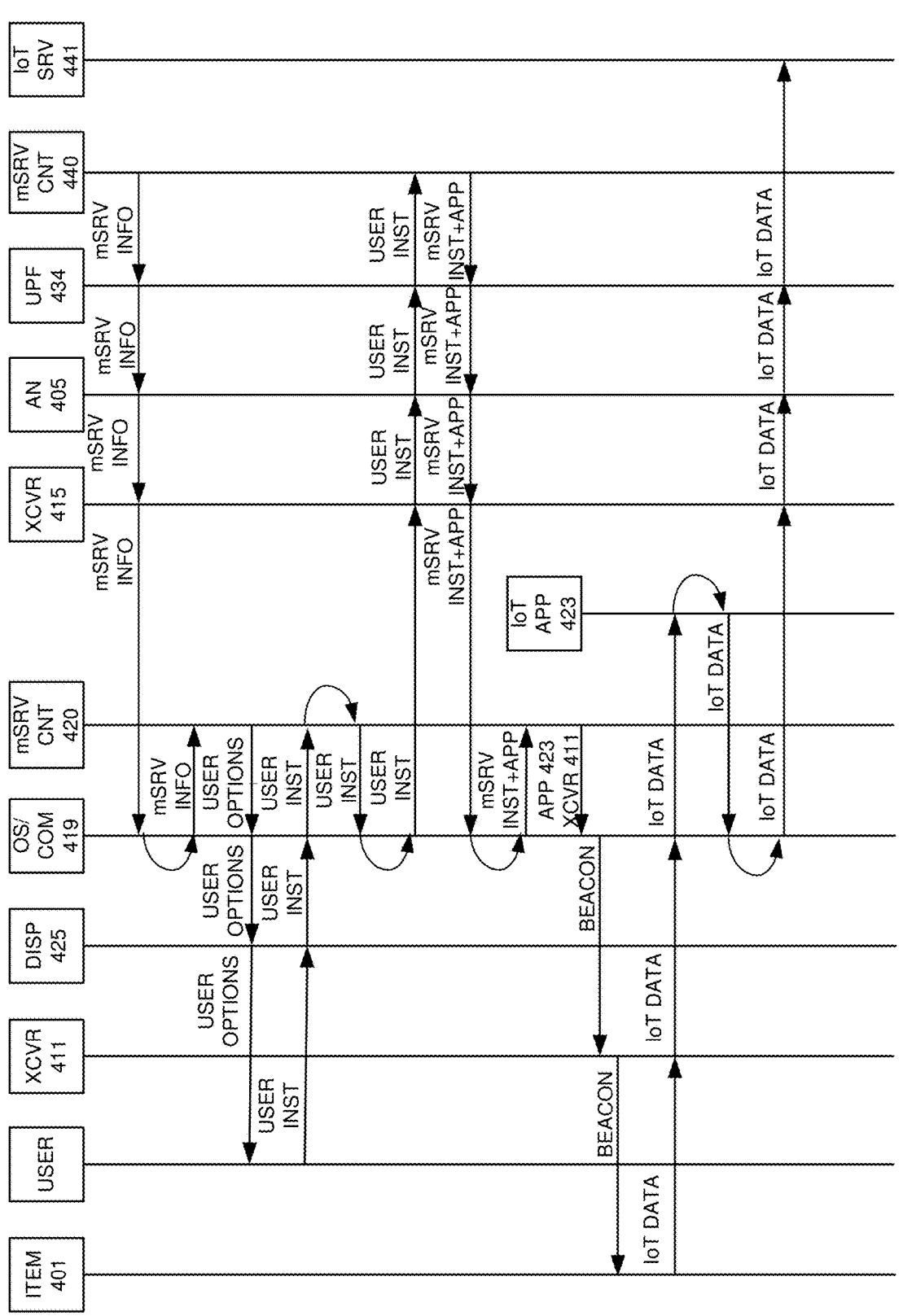
FIG. 9 illustrates an exemplary operation of the 5G communication network that comprises the wireless UE to host the IoT microservice.

FIG. 9 illustrates an exemplary operation of 5G communication network 400 that comprises wireless UE 410 to host the IoT microservice. The operation may vary in other examples. Microservices control server 435 transfers microservice participation data to microservice controller 420 over UPF 434, 5GNR AN 405, 5GNR transceiver 415, and OS/COM 419. Microservice controller 420 signals OS/COM 419 to drive display 425 to present user options for microservice hosting that are based on the microservice participation data. Display 425 presents the options, and in response, receives user instructions for microservice hosting from the user and transfers the user instructions to microservices controller 420 over OS/COM 419. Microservices controller 420 transfers the user instructions to microservice control server 435 over OS/COM 419, 5GNR transceiver 415, 5GNR AN 405, and UPF 434. Microservice control server 435 receives the user instructions for microservice hosting from microservice controller 420. Microservice control system 130 matches UE 410 with the IoT microservice based on the user instructions and the IoT microservice request. For example, UE 410 may offer adequate quality and low-cost in a poor neighborhood to a non-profit microservice that requires adequate quality at a low-cost in the poor neighborhood. Microservice control server 435 generates and transfers IoT microservice instructions and IoT application 423 to microservices controller 420 over UPF 434, 5GNR AN 405, 5GNR transceiver 415, and OS/COM 419. Microservices controller 420 receives the IoT microservice instructions and IoT microservice application 423. Microservice controller 420 directs OS/COM 419 to execute IoT application 423 per the IoT microservice instructions. OS/COM 419 generates operating system container 421 to execute IoT application 423 per the IoT microservice instructions. When executed in container 421, IoT application 423 directs OS/COM 420 to drive BLE transceiver 411 to transmit an IoT beacon signal. Item 401 receives the IoT beacon and transfers IoT data to IoT application 423 over BLE transceiver 411 and OS/COM 419 per the IoT microservice instructions. IoT application 423 may process the IoT data. IoT application 423 transfers the IoT data to IoT server 441 over OS/COM 419, 5GNR transceiver 415, 5GNR AN 405, and UPF 434 per the IoT microservice instructions. For example, IoT application 423 may only transfer the IoT data to IoT server 441 in the middle of the night when the battery in UE 410 is charging.

Figure 10:
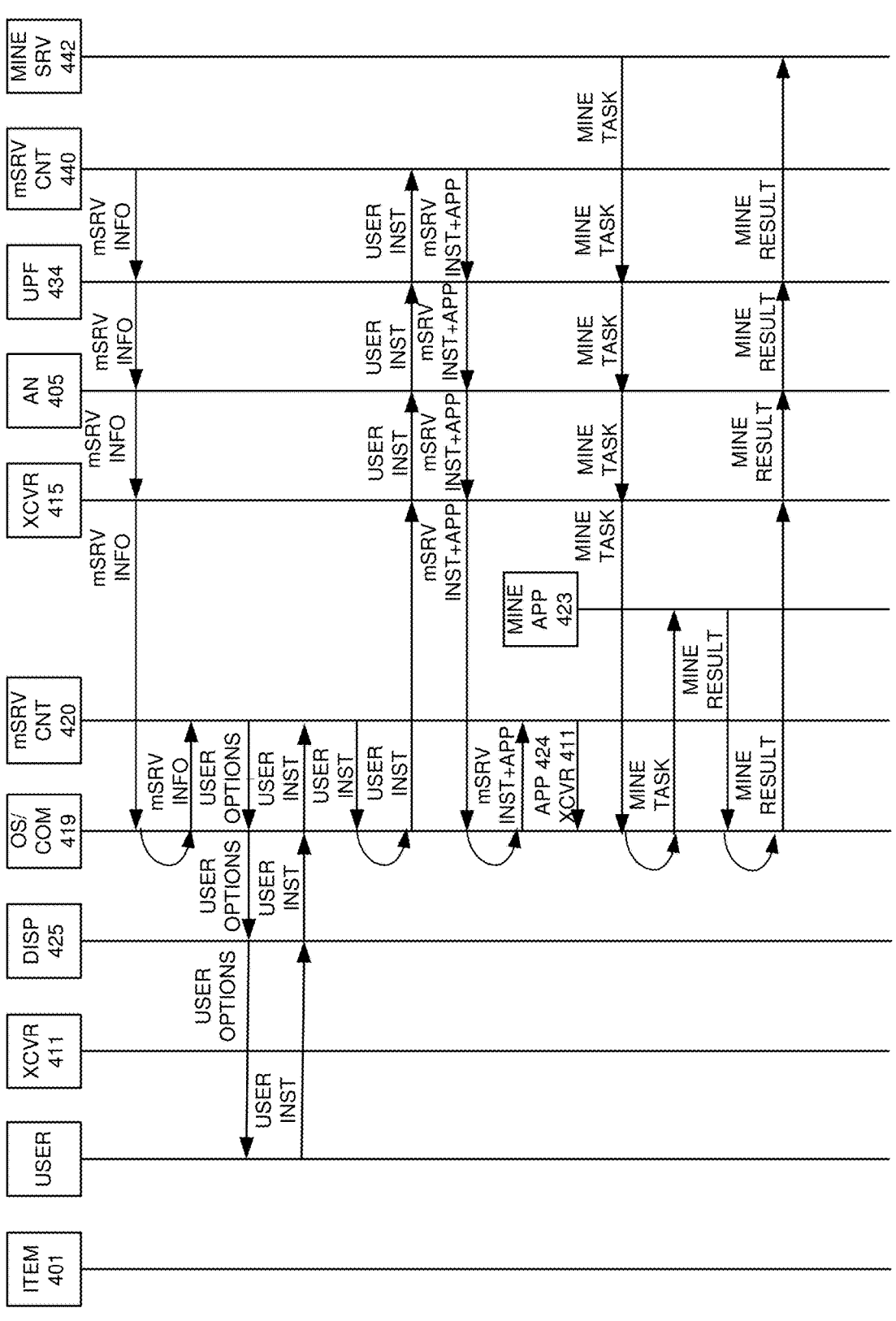
FIG. 10 illustrates an exemplary operation of the 5G communication network that comprises the wireless UE to host the crypto-currency mining microservice.

FIG. 10 illustrates an exemplary operation of 5G communication network 400 that comprises wireless UE 410 to host the crypto-currency mining microservice. The operation may vary in other examples. Microservices control server 435 transfers microservice participation data to microservice controller 420 over UPF 434, 5GNR AN 405, 5GNR transceiver 415, and OS/COM 419. Microservice controller 420 signals OS/COM 419 to drive display 425 to present user options for microservice hosting that are based on the microservice participation data. Display 425 presents the options, and in response, receives user instructions for microservice hosting from the user and transfers the user instructions to microservices controller 420 over OS/COM 419. Microservices controller 420 transfers the user instructions to microservice control server 435 over OS/COM 419, 5GNR transceiver 415, 5GNR AN 405, and UPF 434. Microservice control server 435 receives the user instructions for microservice hosting from microservice controller 420. Microservice control system 130 matches UE 410 with the crypto-currency mining microservice based on the user instructions and the mining microservice request. For example, UE 410 may offer high-quality memory at a low-cost to a mining microservice that desires to offer high-quality and low-cost memory. Microservice control server 435 generates and transfers crypto-currency mining microservice instructions and mining application 424 to microservices controller 420 over UPF 434, 5GNR AN 405, 5GNR transceiver 415, and OS/COM 419. Microservices controller 420 receives the mining microservice instructions and mining microservice application 424. Microservice controller 420 directs OS/COM 419 to execute mining application 424 per the mining microservice instructions. OS/COM 419 generates operating system container 422 to execute mining application 424 per the mining microservice instructions. When executed in container 422, mining application 423 receives crypto-currency mining tasks from mining server 442 over UPF 434, 5GNR AN 405, 5GNR transceiver 415, and OS/COM 419. Mining application performs the crypto-currency mining tasks to generate crypto-currency mining results. Mining application 424 transfers the crypto-currency mining results to mining server 442 over OS/COM 419, 5GNR transceiver 415, 5GNR AN 405, and UPF 434 per the mining microservice instructions.

In some examples, wireless UE 410 and other similar UEs are deployed as a Smartphone Platform as a Service (SPaaS) layer. The SPaaS allows the smartphones to opportunistically gather and process data for microservice IoT applications that can tolerate sporadic connectivity from passing smartphones. Because many IoT applications are tolerant of delays in data delivery, the smartphones need not have immediate and direct network access for all applications. The SPaaS also facilitates other types of applications that benefit from distributed computing, including crypto-mining. The smartphones can communicate with each other directly to form relay or mesh networks to deliver data to the internet. If no means of connection is immediately available, the smartphones have storage to buffer data and transmit the data when a connection becomes available.

A SPaaS server may be used to connect the owners of the smartphones to the microservices that want to use the SPaaS for opportunistic communication with deployed IoT devices and other applications. The SPaaS server may buy the use of the offered smartphone resources from the smartphone owners and resell the smartphone resources to the accepted microservices. The SPaaS server may also receive offers for desired smartphone resources and transfer these offers to the smartphone owners for acceptance. The SPaaS server matches the needs of microservice-based applications to the features offered by the smartphones based on various factors. The SPaaS then deploys the appropriate microservice applications to the smartphones that match the microservice criteria. Once the SPaaS installs a microservice application on a smartphone and the microservice has data to send, then the SPaaS may select the radio technologies based on the requirements of the application and the permissions granted by the smartphone owner.

The SPaaS uses containerized microservices hosted on the smartphones to allow the secure use of smartphone resources by the third-parties without risk of the smartphone owners' own data being accessed without permission. Similarly, the data being gathered and processed by the containerized microservices is secure from access by the owners of the smartphones or by other applications or services hosted on the smartphones. Exemplary applications that benefit from SPaaS include package/item tracking, device-to-device sharing and communication, vehicular/pedestrian safety, meter reading, environmental sensors, and the like. In addition, the applications may use smartphone storage and compute resources to support cryptocurrency mining, blockchain, distributed applications, and others. Processing-intensive applications could be limited to situations where energy consumption would not directly impact the owner like when the battery is above 50%, the phone is charging, and the user is not using the phone.

The smartphone owner can limit which resources they wish to make available to the SPaaS. Exemplary limitations include control over radio technologies like 5GNR, public WIFI, Bluetooth, and RFID. Exemplary limitations include radio technology selection, location data anonymization, smartphone CPU/GPU usage, and persistent/non-persistent memory usage. The smartphone owners may be updated on how smartphone resources were used by the SPaaS. The use of radio technologies could be based on the battery-status of the smartphone. When the battery is low, Bluetooth Low Energy (BLE) could be used to transmit the data.

The smartphone owners are financially compensated for the use of their smartphone resources by the microservice applications. The financial compensation delivers a revenue stream from the capital investment of the smartphone purchase and could significantly offset the expense of the smartphone for the consumer. Factors to determine the amount of compensation include length of radio usage, type of radio connection, CPU/memory usage, data priority, payment factor, and the like. In some examples, the compensation=payment factor*[(radio usage time*radio type factor)+CPU usage time). SPaaS buyers can choose how much they are willing to pay to have their data gathered and forwarded. Smartphone owners can choose how much compensation they require to allow their phones to be used by the SPaaS. Some smartphone owners may only allow their smartphone to be used by the highest paying services to minimize the impact to their phone. Other smartphone owners may choose to allow all paying microservices to maximize their compensation. The SPaaS may offer a choice to smartphone owners regarding compensation that include credits toward communication services, cash, or cryptocurrency. The amount of compensation can depend upon the currency chosen with a discount factor applied based on the choice. For example, cash might have a currency discount of 0%, communication service credits a currency discount of 25%, and cryptocurrency a currency discount of 50%. In some examples, the compensation=compensation/(1−currency discount).

The SPaaS deploys a smartphone-based IoT gateway system and distributed computing system where containerized microservices for various applications can be securely and selectively deployed to appropriate smartphones. The smartphone owners can be compensated for the use of their devices. The radio connection used by the application can be matched between the needs of the application and the permissions granted by the smartphone owner. The amount of compensation provided to the smartphone owner can be based on the resources used and on a payment factor that allows matching of supply and demand for this service.

The wireless data network circuitry described above comprises computer hardware and software that form special-purpose UE circuitry to host microservices. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose UE circuitry to host microservices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention.

Thus, the invention is not limited to the specific embodiments described above, but only by the following claims and their equivalents.

What is claimed is:

1. A method comprising:

receiving a registration request from a User Equipment (UE), registering the UE, and authorizing the UE to use microservice slice;

transferring microservice information to the UE, and in response, receiving a user instruction from the UE;

selecting a user application and the microservice slice for the UE based on the user instruction;

transferring the user application for the microservice slice that the UE is authorized to use to the UE;

generating a containerinstruction for the user application selected for the UE;

transferring the container instruction to the UE, wherein the UE executes the user application in an operating system container per the container instruction, generates user application data in response to the execution of the user application, and transfers the user application data to the microservice slice; and receiving the user application data from the UE into the microservice slice.

2. The method of claim 1 wherein:

generating and transferring the container instruction comprises generating and transferring a microprocessor usage instruction; and the UE executes the user application in the operating system container per the microprocessor usage instruction.

3. The method of claim 1 wherein:

generating and transferring the container instruction comprises generating and transferring a memory usage instruction; and the UE executes the user application in the operating system container per the memory usage instruction.

4. The method of claim 1 wherein:

generating and transferring the container instruction comprises generating and transferring a battery-status instruction; and the UE executes the user application in the operating system container per the battery-status instruction.

5. The method of claim 1 wherein:

generating and transferring the container instruction comprises generating and transferring a geographic-location instruction; and the UE executes the user application in the operating system container per the geographic-location instruction.

6. The method of claim 1 wherein:

generating and transferring the container instruction comprises generating and transferring a time/day/date instruction; and the UE executes the user application in the operating system container per the time/day/date instruction.

7. The method of claim 1 wherein:

transferring the user application to the UE comprises transferring an environmental sensor application;

generating the container instruction for the user application comprises generating the container instruction for the environmental sensor application;

transferring the container instruction to the UE comprises transferring the container instruction for the environmental sensor application, wherein the UE executes the environmental sensor application in the operating system container per the container instruction, generates environmental sensor data in response to the execution of the environmental sensor application, and transfers the environmental sensor data to the microservice slice; and receiving the environmental sensor data from the UE into the microservice slice.

8. The method of claim 1 wherein:

transferring the user application to the UE comprises transferring a crypto-currency mining application;

generating the container instruction for the user application comprises generating the container instruction for the crypto-currency mining application;

transferring the container instruction to the UE comprises transferring the container instruction for the crypto-currency mining application, wherein the UE executes the crypto-currency mining application in the operating system container per the container instruction, generates crypto-currency mining data in response to the execution of the crypto-currency mining application, and transfers the crypto-currency mining data to the microservice slice; and receiving the crypto-currency mining data from the UE into the microservice slice.

9. One or more non-transitory computer readable storage media havingprogram instructions stored thereon, wherein the program instructions, when executed by a computing system, direct the computing system to perform operations, the operations comprising:

receiving a registration request from a User Equipment (UE), registering the UE, and authorizing the UE to use a microservice slice;

transferring microservice information to the UE, and in response, receiving a user instruction from the UE;

selecting a user application and the microservice slice for the UE based on the user instruction;

transferring the user application for the microservice slice that the UE is authorized to use to the UE;

generating a container instruction for the user application selected for the UE;

transferring the container instruction to the UE, wherein the UE executes the user application in an operating system container per the container instruction, generates user application data in response to the execution of the user application, and transfers the user application data to the microservice slice; and receiving the user application data from the UE into the microservice slice.

10. The one or more non-transitory computer readable storage media of claim 9 wherein:

generating and transferring the container instruction comprises generating and transferring a microprocessor usage instruction; and the UE executes the user application in the operating system container per the microprocessor usage instruction.

11. The one or more non-transitory computer readable storage media of claim 9 wherein:

generating and transferring the container instruction comprises generating and transferring a memory usage instruction; and the UE executes the user application in the operating system container per the memory usage instruction.

12. The one or more non-transitory computer readable storage media of claim 9 wherein:

generating and transferring the container instruction comprises generating and transferring a battery-status instruction; and the UE executes the user application in the operating system container per the battery-status instruction.

13. The one or more non-transitory computer readable storage media of claim 9 wherein:

generating and transferring the container instruction comprises generating and transferring a geographic-location instruction; and the UE executes the user application in the operating system container per the geographic-location instruction.

14. The one or more non-transitory computer readable storage media of claim 9 wherein:

generating and transferring the container instruction comprises generating and transferring a time/day/date instruction; and the UE executes the user application in the operating system container per the time/day/date instruction.

15. The one or more non-transitory computer readable storage media of claim 9 wherein:

transferring the user application to the UE comprises transferring an environmental sensor application;

generating the container instruction for the user application comprises generating the container instruction for the environmental sensor application;

transferring the container instruction to the UE comprises transferring the container instruction for the environmental sensor application, wherein the UE executes the environmental sensor application in the operating system container per the container instruction, generates environmental sensor data in response to the execution of the environmental sensor application, and transfers the environmental sensor data to the microservice slice; and receiving the environmental sensor data from the UE into the microservice slice.

16. The one or more non-transitory computer readable storage media of claim 9 wherein:

transferring the user application to the UE comprises transferring a crypto-currency mining application;

generating the container instruction for the user application comprises generating the container instruction for the crypto-currency mining application;

transferring the container instruction to the UE comprises transferring the container instruction for the crypto-currency mining application, wherein the UE executes the crypto-currency mining application in the operating system container per the container instruction, generates crypto-currency mining data in response to the execution of the crypto-currency mining application, and transfers the crypto-currency mining data to the microservice slice; and receiving the crypto-currency mining data from the UE into the microservice slice.

17. A wireless communication system comprising:

processing circuitry, memory circuitry, a network function, a microservice controller, and a microservice slice;

the memory circuitry configured to store the network function, the microservice controller, and the microservice slice;

the processing circuitry configured to execute the network function, the microservice controller, and the microservice slice;

the network function configured to:

receive a registration request from a wireless User Equipment (UE);

register the wireless UE; and authorize the wireless UE to use the microservice slice; and a microservice controller configured to:

transfermicroservice information to a wireless User Equipment (UE) the wireless UE, and in response, receive a user instruction from the wireless UE;

select a microservice application and the microservice slice for the wireless UE based on the user instruction;

generate a microservice instruction for the microservice application selected for the wireless UE; and transferthe microservice instruction and the microservice application to the wireless UE, wherein the wireless UE executes the microservice application in an operating system container per the microservice instruction to generate andtransfer microservice data to the microservice slice selected for the wireless UE; and the microservice slice configured to receive and process the microservice data.

18. The wireless communication system of claim 17 wherein:

the microservice information comprises a financial compensation option;

the user instruction comprises a financial compensation instruction; and the microservice instruction comprises the financial compensation instruction.

19. The wireless communication system of claim 17 wherein:

the microservice information comprises a monetary currency option;

the user instruction comprises a monetary currency instruction; and the microservice instruction comprises the monetary currency instruction.

20. The wireless communication system of claim 17 wherein the microservice instruction comprises at least one of a microprocessor usage instruction and a memory usage instruction.

\* \* \* \* \*